(12) United States Patent
Xing et al.

(10) Patent No.: US 11,514,381 B2
(45) Date of Patent: Nov. 29, 2022

(54) PROVIDING CUSTOMIZED INTEGRATION FLOW TEMPLATES

(71) Applicant: International Business Machines Corporation, Armonk, NY (US)

(72) Inventors: Chengxuan Xing, Romsey (GB); Ashley Donald Harrison, Southampton (GB); Matthew Paul Chapman, Eastleigh (GB); Andrew James Daniel, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 381 days.

(21) Appl. No.: 16/799,300

(22) Filed: Feb. 24, 2020

(65) Prior Publication Data
US 2021/0264333 A1 Aug. 26, 2021

(51) Int. Cl.
*G06Q 10/06* (2012.01)
*H04L 47/783* (2022.01)
*H04L 47/70* (2022.01)
*H04L 47/80* (2022.01)

(52) U.S. Cl.
CPC ....... *G06Q 10/0633* (2013.01); *H04L 47/783* (2013.01); *H04L 47/805* (2013.01); *H04L 47/808* (2013.01); *H04L 47/828* (2013.01)

(58) Field of Classification Search
CPC ... H04L 47/808; H04L 47/805; H04L 47/783; H04L 47/828; G06Q 10/0633
See application file for complete search history.

(56) References Cited

U.S. PATENT DOCUMENTS

| 2004/0044986 A1 | 3/2004 | Kompalli et al. |
| 2007/0038499 A1 | 2/2007 | Margulies et al. |
| 2008/0301175 A1* | 12/2008 | Applebaum ...... G06F 16/24565 707/999.102 |

(Continued)

FOREIGN PATENT DOCUMENTS

| CN | 105045228 A | 11/2015 |
| CN | 106503970 A | 3/2017 |
| CN | 107886295 A | 4/2018 |

OTHER PUBLICATIONS

"New Record State Extraction," Debezium Documentation, Printed: Jan. 10, 2020, 4 pages. https://debezium.io/documentation/reference/1.0/configuration/event-flattening.html.

(Continued)

*Primary Examiner* — Oussama Roudani
(74) *Attorney, Agent, or Firm* — Kimberly Zillig

(57) ABSTRACT

A method and system are provided for customizing integration flow templates. The method can include can include monitoring user interaction with a plurality of systems external to an integration system to read data changes at the external systems and identifying at least one event pair, wherein each event pair is between two external systems having a same data change event in the two external systems. The identified event pairs are filtered for inclusion in an events chain and the external systems of the filtered event pairs are ordered in the events chain based on timestamps of the data change events. The method outputs integration flow templates based on the ordered external systems of the event pairs that define a flow trigger and at least one flow node.

20 Claims, 8 Drawing Sheets

(56) References Cited

U.S. PATENT DOCUMENTS

| | | | |
|---|---|---|---|
| 2010/0070480 A1* | 3/2010 | Ahuja | G06F 16/23 |
| | | | 707/703 |
| 2010/0223629 A1 | 9/2010 | Appelbaum et al. | |
| 2011/0209162 A1 | 8/2011 | Machiraju et al. | |
| 2013/0019223 A1 | 1/2013 | Patrascu et al. | |
| 2016/0127465 A1* | 5/2016 | Barstow | G06F 16/273 |
| | | | 707/620 |
| 2017/0017677 A1* | 1/2017 | Jolfaei | G06F 16/2358 |
| 2017/0310451 A1* | 10/2017 | Barlow | G06Q 30/01 |
| 2018/0131556 A1 | 5/2018 | Band et al. | |
| 2019/0018546 A1* | 1/2019 | Kwizera | G06Q 30/0208 |
| 2020/0396232 A1* | 12/2020 | Lee | H04L 41/069 |

OTHER PUBLICATIONS

Mell et al., "The NIST Definition of Cloud Computing", Recommendations of the National Institute of Standards and Technology, Special Publication 800-145, Sep. 2011, 7 pages.

Notification of Transmittal of the International Search Report and the Written Opinion of the International Searching Authority, of the Declaration, International Application No. PCT/IB2021/051108, dated May 17, 2021, 10 pages.

\* cited by examiner

PROVIDING CUSTOMIZED INTEGRATION FLOW TEMPLATES

BACKGROUND

The present invention relates to managing integration flows, and more specifically, to providing customized integration flow templates based on user activity.

In integration products, users can create integration flows to perform different actions in different systems when the integration is triggered. An integration product enables information packaged as messages to flow between different business applications in multiple external systems. The business applications can, in some cases, be provided by external cloud service systems, also known as Software as a Service (SaaS) systems.

A simple integration flow can be, for example, that when a new lead is created in a cloud service marketing system, a lead with same information is created in a cloud service sales system. This simple flow helps its user to synchronize leads between their cloud service marketing system and their cloud service sales system and is a typical flow that most businesses who are using both cloud service marketing and sales software products will be interested in.

An integration product can provide templates for forms of integration flows that are of interest to multiple users and these are generated based on typical use cases. In order to select a template to build their own flows, customers need to select a template based on their business use case and modify the template flow based on their specific requirements.

As there are many templates for businesses to choose from, the act of finding and utilizing a suitable template can be time-consuming and confusing, especially for users that may not yet know exactly which systems and flows they want to implement.

Modifying an existing template can involve performing some actions to tailor the template flow to fit with the user's business needs. This can include adding or removing system nodes if the template did not contain all the systems being used, and/or adding or removing field mappings between system nodes. These modifications can be time consuming and difficult to implement for inexperienced users.

SUMMARY

Embodiments can be directed towards a computer-implemented method for providing customized integration flow templates, comprising: monitoring user interaction with a plurality of systems external to an integration system to read data changes at the external systems; identifying at least one event pair, wherein each event pair is between two external systems having a same data change event in the two external systems; filtering at least one event pair for inclusion in an events chain; ordering the external systems of the filtered event pairs in the events chain based on timestamps of the data change events; and outputting a template of an integration flow based on the ordered external systems of the event pairs that define a flow trigger and at least one flow node.

Embodiments can also be directed towards a system for providing customized integration flow templates, comprising: a processor circuit and a memory configured to provide computer program instructions to the processor circuit to execute the function of the component: an external system monitoring component for monitoring user interaction with a plurality of systems external to an integration system to read data changes at the external systems; an event pair identifying component for identifying at least one event pair, wherein each event pair is between two external systems having a same data change event in the two external systems; a filtering component for filtering at least one event pair for inclusion in an events chain; an ordering component for ordering the external systems of the filtered event pairs in the events chain based on timestamps of the data change events; and a template output component for outputting a template of an integration flow based on the ordered external systems of the event pairs that define a flow trigger and at least one flow node.

Embodiments can also be directed towards a computer program product for providing customized integration flow templates, the computer program product comprising a computer-readable storage medium having program instructions embodied therewith, the program instructions executable by a processor circuit to cause the processor circuit to: monitor user interaction with a plurality of systems external to an integration system to read data changes at the external systems; identify at least one event pair, wherein each event pair is between two external systems having a same data change event in the two external systems; filter at least one event pair for inclusion in an events chain; order the external systems of the filtered event pairs in the events chain based on timestamps of the data change events; and output a template of an integration flow based on the ordered external systems of the event pairs that define a flow trigger and at least one flow node.

The computer-readable storage medium can be a non-transitory computer-readable storage medium and the computer-readable program code can be executable by a processing circuit. The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
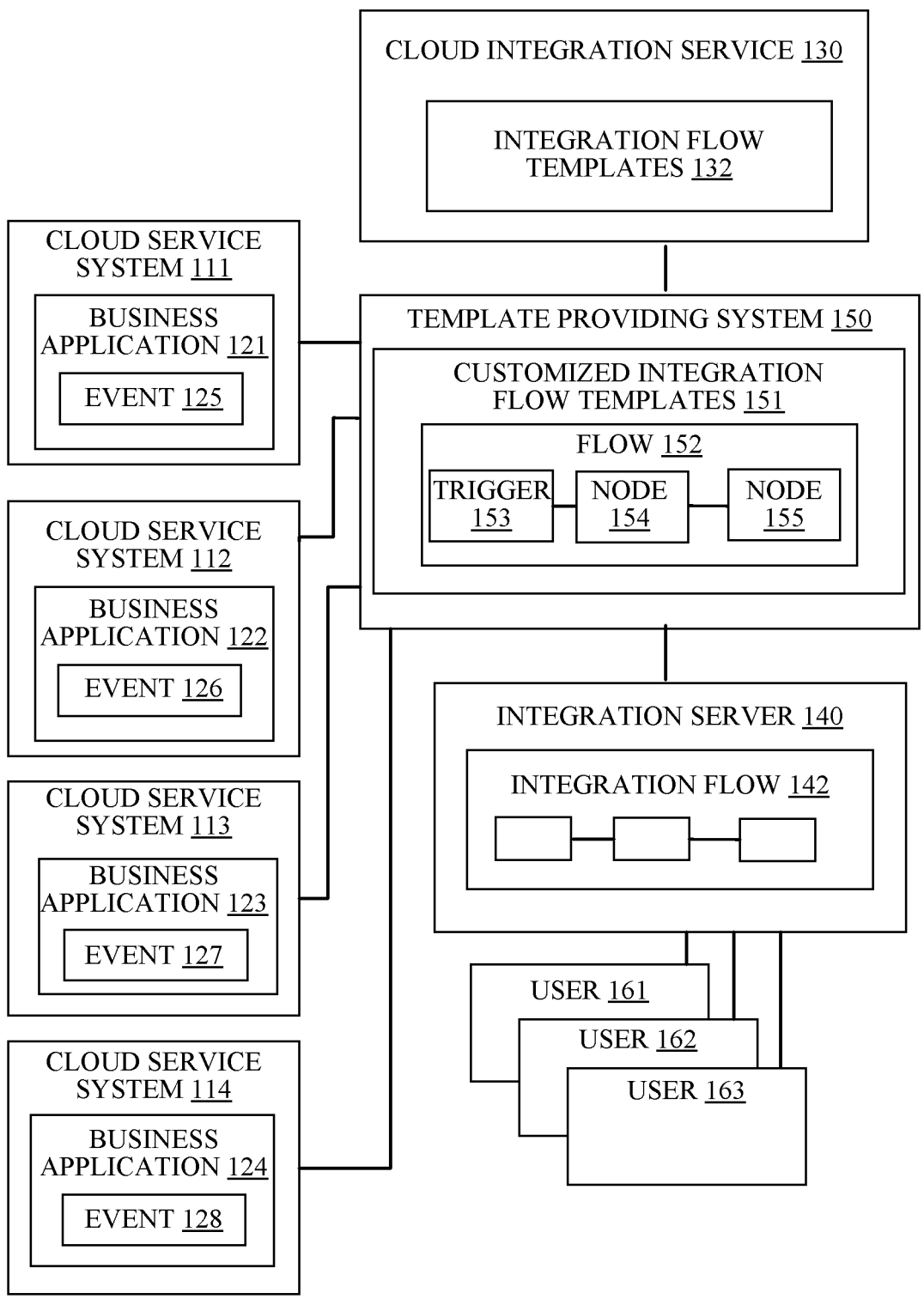
FIG. 1 is a schematic diagram of a system, according to embodiments of the present disclosure.

It will be appreciated that for simplicity and clarity of illustration, elements shown in the figures have not necessarily been drawn to scale. For example, the dimensions of some of the elements can be exaggerated relative to other elements for clarity. Further, where considered appropriate, reference numbers may be repeated among the figures to indicate corresponding or analogous features.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

In the drawings and the Detailed Description, like numbers generally refer to like components, parts, steps, and processes.

DETAILED DESCRIPTION

A system and method are described for providing customized integration flow templates for users of an integration product. The method provides integration templates that are tailored for users based on the data changes in their external systems during a certain period of time. The system utilizes the flow of information between those external systems to determine a useful integration template that can be implemented to automate these tasks. A user then can use this flow as a starting point to build their own flow.

The method identifies correlations in data flowing through a number of disparate systems and uses those correlations to generate integration flows. This benefits the user by providing an integration flow template as a relevant starting point, instead of having to search through existing templates, build a flow from scratch, or continue to rely on manual processing.

Referring to FIG. 1, a block diagram depicts an example embodiment of a system 100 including an integration server 140 for an enterprise providing an integration product for multiple users 161-163 of the enterprise for integrating interactions with business applications. The business applications 121-123 can be provided as cloud services on external cloud service systems 111-113. The cloud services can be referred to as Software as a Service (SaaS). The business applications 124 can also be provided on a non-cloud based computer system 114 local or remote to the enterprise. The systems 111-114 providing the business applications 121-124 are referred to as external systems as they are external to the integration system.

The integration server 140 can be provided as a fully-managed integration platform on the cloud from a cloud integration service 130. The integration server 140 can be deployed from packaged integration assets provided to an enterprise client by a toolkit. An integration server 140 may run its own container to ensure separation of workload and to allow an enterprise client to package an application with all of its dependencies into a standard unit for software development, containing all the necessary components, including runtime, system tools and libraries to enable the client to deploy their integration solution.

Enterprise clients can build integration flows 142 between the business applications 121-124 and the integration flows 142 can be exposed as application programming interface (API) operations. The integration flows 142 provide an automated movement of data between a source and a target. Integration flow templates 132 can be provided by the cloud integration service 130.

The described system includes a template providing system 150 for an integration server 140 to provide customized integration flow templates 151 for an enterprise client based on interactions of users 161-163 with the business applications 121-124. The link between the template providing system 150 and the integration server 140 is the integration flow schema so that it can generate a flow template that can be used on that specific integration server 140.

Events 125-128 are captured in the external systems 111-114 and a customized integration flow template 151 can be generated with at least one flow 152 each including a trigger 153 and at least one node 154, 155. A node represents a specific action that triggers the corresponding event in the target system.

For a trigger or a node, there are three key pieces of information:
1. Which external system it represents.
2. Which event it captures for a trigger or which action it takes for a node. (For example, created, updated event <for trigger >, delete, update action <for action>).
3. Which target object that event or action is for.

A node represents a specific action that will trigger the corresponding event in the target system. For example, the event can be a lead created in a sales system and the flow will have a "Sale Create Lead" node.

Figure 2A:
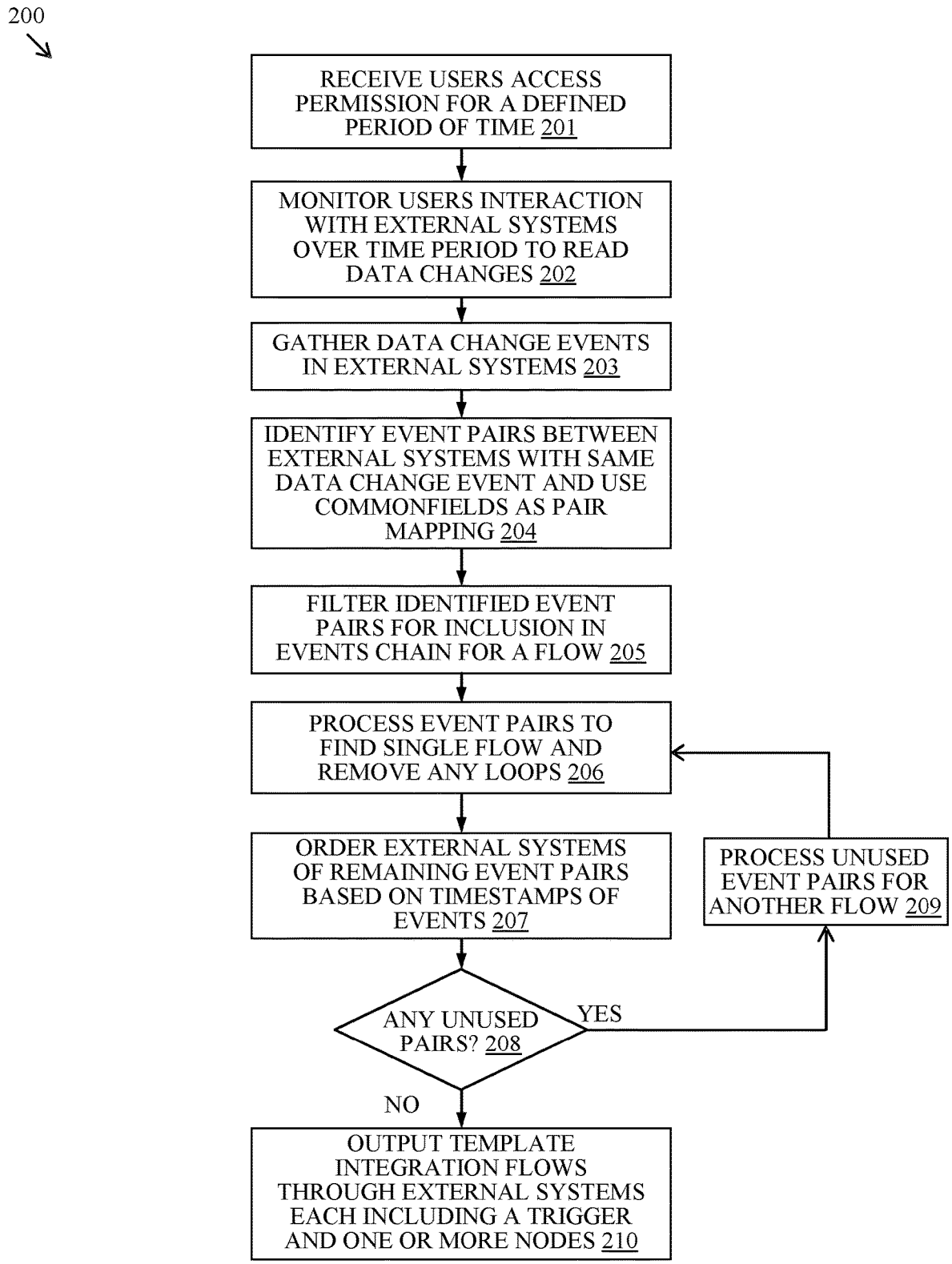
FIG. 2A is a flow diagram depicting details of method, according to embodiments consistent with the figures.

Referring to FIG. 2A, flow diagram 200 depicts an example embodiment of the described method carried out at a template providing system 150. The method can be carried out at a client's integration system or remotely via a cloud integration service 130.

The method can receive 201 users' access permission to read data changes during a period of time from multiple external systems. External systems are any systems that are not part of the integration system, including local and cloud service systems running business applications. The method can monitor 202 users' interactions with the external systems over a defined period of time. The monitoring 202 can be on a per account basis with user configurations for monitoring users or groups of users in an enterprise.

The monitoring can include providing a set of changes that have already happened or by allowing the integration server to listen on the data changes for a next defined period of time. This gathers 203 data change events that take place in the external systems. Data change events can have multiple fields in each external system with data values that are changed.

Once the data change events are collected, the data change events are used to determine customized or tailored integration flow templates.

This includes identifying 204 event pairs of external systems that have same data changes in the data change events. Identifying event pairs can be carried out for the data change events of each system, by comparing the events with the data change events of the rest of the external systems. Two systems can be marked as a pair if they have fields containing the same value with a one-to-one mapping relationship among a majority of the data change events. The fields containing the same values are referenced as common fields and the data change events containing the same values are referenced as same data change events. The common fields are used as the mappings between two nodes.

The identified event pairs can be processed. A filter 205 can be performed on the identified event pairs based on defined criteria for including the event pair in an events chain as the trigger or as an event node. Each event pair must have common fields with another pair in the chain.

The filtering 205 can be based on a threshold number of same data values in common fields in the event pairs. A predefined percentage of same data change events of one external system can be used to chain up all the other pairs in the chain. Those same data change events can be referenced as endpoints at the trigger and last node of a same data change events chain.

One of the benefits of the method is that it does not rely on any similarity of field names to recognize mappings. The field names can be completely different between two external systems and they are identified by value matchings only. This will cause a large number of mappings if the values are Boolean or Numbers, but they will be filtered out by the pre-set matching rate.

Further processing 206 can be carried out to find a single flow and to remove loops in the flow. This can include limiting event pairs such that:

each pair must have a unique combination of external systems;
each external system can only be in two pairs at most; and
there should be at least two external systems that only appear once in the all the event pairs, as these will form the trigger and end nodes.

The discarded event pairs are kept for subsequent processing for at least one potential additional flow template.

Figure 3:
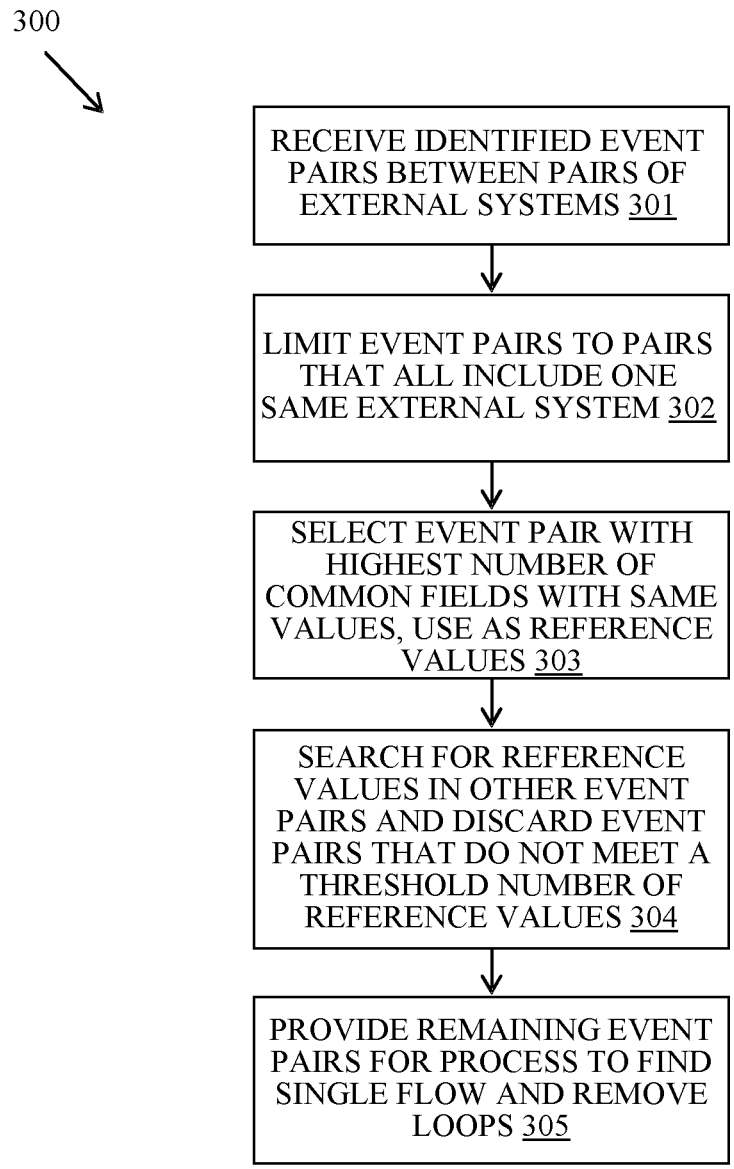
FIG. 3 is a flow diagram depicting of an aspect of a method, according to embodiments consistent with the figures.

The filtering 205 and processing 206 can be carried out using constraint programming or an iteration logic, for example, as described further in relation to FIG. 3.

Each event pair in the final group of event pairs must have common fields with another pair in group. The group of systems is ordered 207 based on timestamps of events such that they define a chronological events chain. This can include identifying which are the source and target systems from the timestamps in order to identify the trigger and at least one flow node.

The order of external systems in the chain is organized to generate the finalized flow. For each endpoint of the same data change events chain, iterate through the data change in the chain and order the position of the pairs in the chain by comparing the timestamps of the majority of same data change events to generate the finalized integration template.

Two same data change events chains are considered as duplicate if they share the same set of same data change events and one contains all the external systems in another. The shorter chain can be discarded or a random one can be discarded, if two chains are of the same lengths.

It is determined 208 if there are any unused event pairs discarded by the processing 206. If so, these are processed 209 for another flow by looping the method.

Once there are no more unused pairs, the at least one resultant flow can be output 210 as template integration flows or can be used to match to existing template integration flows. An output template integration flow can be stored as a template for other users with the originating user's consent.

The user may then validate and finish the integration flow for their environment, and optionally adapt the flow further.

Figure 2B:
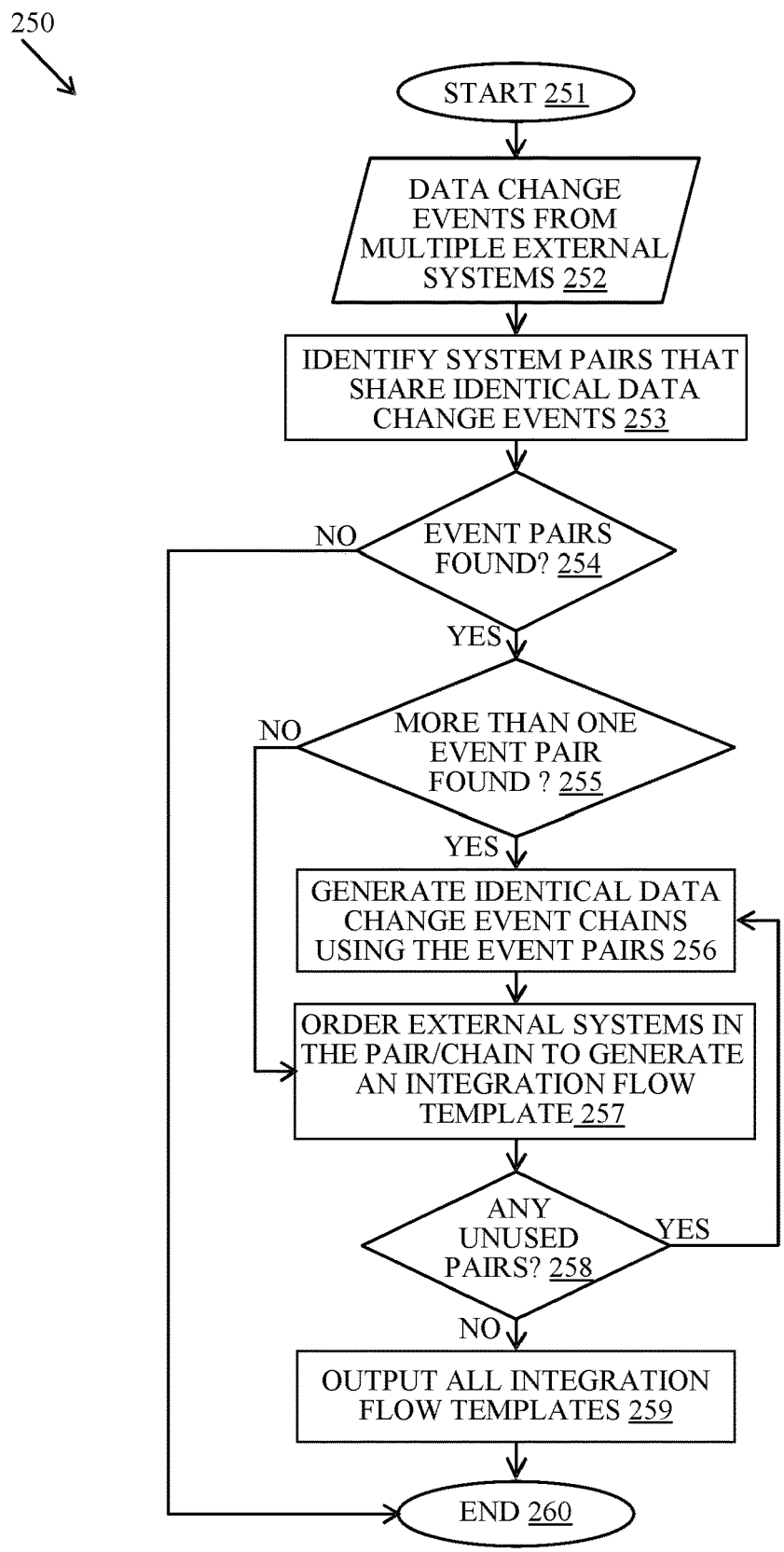
FIG. 2B is a flow diagram depicting further details of the method depicted in FIG. 2, according to embodiments consistent with the figures.

Referring to FIG. 2B, a flow diagram 250 depicts an example embodiment of the described method carried out at a template providing system 150.

The method can start 251 and data change events can be gathered 252 from multiple external systems. The method can identify 253 event pairs that share same data change events.

It can be determined 254 if event pairs are found. If no event pairs are found, the method can end 260. If event pairs are found, it can be determined 255 if more than one event pair are found. If so, the method can generate 256 same data change event chains using the multiple event pairs.

In the case of only one event pair being found, the method can order 257 the external systems in the event pair by time to generate an integration template. In the case of multiple event pairs being found and grouped in an event chain, the method can order 257 the external systems in the chain by time to generate an integration flow template.

It can be determined 258 if there are any unused event pairs discarded in generating the previous integration flow template. If so, these are processed to generate 256 another integration flow template by looping the method. If there are no unused event pairs, the method can output 259 all the integration flow templates. The method can then end 260.

Referring to FIG. 3, a flow diagram 300 depicts an example embodiment of the aspect of the method of FIG. 2A of filtering 205 identified event pairs for inclusion in the events chain.

The method can receive 301 the identified event pairs between pairs of external systems. The event pairs can be limited 302 to event pairs that all include one same external system.

The event pairs are checked within the pair of external systems for common fields and an event pair is selected 303 that has the highest number of common fields with the same values of data changes and these values are used as reference values.

The other event pairs are searched 304 to find the number of reference values in each of the other event pairs. Event pairs are discarded if they do not meet a threshold number of reference values. This can be carried out by comparing the same data change events against other pairs to find out the best matching one with the highest same data change events match. The logic can be terminated here if no pair is found with the preset percentage. This can be repeated with the new shared same data change events between selected pairs.

The remaining filtered event pairs can be provided 305 for processing to find a single flow and remove any loops as described in step 206 of FIG. 2A.

After the analysis, the output presents the user with a number of example flows which they can use as a starting point to build their detailed integrations. If insufficient data has passed through the users' systems, no matching data events may have been found, and therefore no example flows will be presented to the user.

Example embodiments are described for illustration of the method. In the examples, the business applications 121-123 include sales and marketing cloud services, an email cloud service, a social media service, a spreadsheet application, and an API all provided in external systems to the integration server.

Example 1

In an external system, only the events are captured. For example:
10:00 A message is received in a Social Media system:
givenname: John,
familyname: Doe,
emailaddress: jd@company.com, sendtime: 9:59)
10:01 A lead is created in a Sales system
firstname: John,
lastname: Doe,
contact: jd@company.com, createddate: 10:01)

12:00 An email is sent in an Email system
email: jd@company.com, sent: 12:00)

For this single value change event, based on the above events, the method determines that the 3 systems are related with the mapping fields:

socialmedia.givenname<->sales.firstname
socialmedia.familyname<->sales.lastname
socialmedia.emailaddress<->sales.contact<->email.email Therefore, the social media system and the sales system have 3 common fields, the social media system and the email system have 1 common field, and the sales system and the email system have 1 common field.

If it is supposed that there are other value change events, and they all have same values but the email system had some noise. The social media system has 10 events which are 100% matching with the sales system's 10 events. The email system has 15 events, with 5 events do not have same values changes in the other two systems.

If the threshold of matching is set above 80%, the email system will not be considered due to the matching rate of 10/15=66.67%. There will be two system events for the template:

Sales system created lead<->Social Media received message.

Then, the method looks at those 10 events, if all of the social media events happened before the sales events, the systems are reordered to generate the following flow:

(Trigger) When Social Media System received a message-> (Action) Sales System creates a lead with firstname using the value from the Social Media givenname, lastname using value from the Social Media familyname, and contact using the value from the Social Media emailaddress.

Example 2

An example use case is described as follows. A user performs the following tasks every day at 10 am (referred to as User Routine 1):
1. Check whether any new customers have been added into a shared spreadsheet.
2. Add contacts for the new customers to external marketing and sales systems, the order of which system first being random.
3. Send a welcome email to those contacts once all actions in Step 2 are completed.

Another user performs the following task regularly during the day (referred to as User Routine 2):
1. Check for new leads in the external marketing system;
2. Call an API system to provision the product for a new customer;
3. Send another email to the customer after Step 2 is complete.

The described method can be used to generate two templates with access to all the systems that are required to carry out the two user tasks.

System 1 event A and system 2 event B is an event pair because field X in system 1's event A had identical value of field Y in system 2's event B. To build a chain that links two pairs (4 systems), the other two system must have field Z and field W respectively in system 3's event C and system 4's event D.

Firstly, two pairs will not be checked against each other if they do not share the same external system event.

For example:
pair AB->Spreadsheet row—Sales lead;
pair BC->Sales lead—Email mail;
pair CD->Email mail—API lead;
pair BD->Sales lead—API lead.

Pairs AB, BC and BD will be checked because they all have B (Sales lead) and CD will be discarded.

Suppose event A (from system 1) and event B (from system 2) both have 8 fields changed with identical values, so that it has 8 common fields (AB pair). For other pairs there are: 10 fields changed with 3 common fields (BC pair), 4 fields changed with 4 common fields (BD pair). As the number of common fields in AB pair is the highest, it will be picked as the starting pair.

A search is made for the identical values of the 8 common fields identified from the AB pair in BC pair's change event. A pre-set percentage threshold is set as =80%. It is found that 3 common fields in BC pair are 3 of the fields in the 8 common fields in the AB pair and the value changes in those 3 common fields are 100% matching. Therefore, it will be recorded in the chain lead by AB pair (AB<->BC).

For BD pair, there is found only 1 field from the BD common field that has a 60% identical value matching with one of the common fields in the AB pair. Therefore, BD will not be in the chain.

Using the example User Routine 1 and User Routine 2, the following pairs will be found:
Spreadsheet system<->Marketing system
Marketing system<->Email system
Sales system<->Email system
Spreadsheet system<->Sales system
Marketing system<->Sales system
Marketing system<->API system
API system<->Email system Following the example set of criteria to find out a single data flow and rule out loops of:
Each pair must have a unique combination of external systems;
Each external system can only be in two pairs at most; and
There should be at least two external systems that only appear once in all the pairs.

If, for example, there are pairs AB, BC, CD, DB and DE: each pair has a unique combination of external systems, A and E only appears once in all the pairs. However, BC-> CD->DB is a loop. In this example, both B and D appeared in more than two pairs. With a good constraints algorithm, DB will be identified and removed according to the requirement that each external system can only be in two pairs at most. This is provided as an example use of the constraints, as in this example BD is not in the chain as it does not meet the 80% matching criteria for the same value changes.

The method is not aiming for generating flows in which actions node can have more than one downstream node. In other words, one of BC and BD will be removed when forming the first flow template and the removed pair will become a second flow template. i.e., the outcome will be flow 1: AB->BC, plus flow 2: BD.

It can find the first flow in the first iteration: There can be multiple ways of deleting based on the constraints listed above. The one with the highest number of pairs will be chosen, a random one if there is a draw among the highest number.

Spreadsheet system<->Marketing system
Marketing system<->Email system (Deleted)
Sales system<->Email system
Spreadsheet system<->Sales system (Deleted)
Marketing system<->Sales system
Marketing system<->API system (Deleted)
API system<->Email system (Deleted)

On the data changes that have been left out in the first iteration:
   Marketing system<->Email system
   Spreadsheet system<->Sales system
   Marketing system<->API system
   API system<->Email system
   It will find another flow:
   Marketing system<->Email system (Deleted)
   Spreadsheet system<->Sales system (Deleted)
   Marketing system<->API system
   API system<->Email system However, in the real use case, there could be different flows as well:
   Spreadsheet system<->Marketing system
   Marketing system<->Email system (Deleted)
   Sales system<->Email system (Deleted)
   Spreadsheet system<->Sales system (Deleted)
   Marketing system<->Sales system (Deleted)
   Marketing system<->API system
   API system<->Email system
   and
   Marketing system<->Email system (Deleted)
   Sales system<->Email system
   Spreadsheet system<->Sales system
   Marketing system<->Sales system (Deleted)

For each same event change chain, the system will collect the timestamp of those events by systems. For example, change events for a data entry with email bob@company.com is added to Sales, Marketing and Email services.
   bob@company.com: 12:10—Sales, 12:11—Email, 10:10—Marketing
   fred@company.com: 12:10—Sales, 12:09—Email, 7:00—Marketing
   jane@company.com: 12:11—Sales, 12:10—Email, 5:00—Marketing Therefore, if all the events are ordered the same with respect to the time, the system in the flow template will reorder. For example, to compose a flow for the example events shared above, the template should have Marketing system ordered before Sales and Email. The order between Sales and Email is not important.

Figure 4:
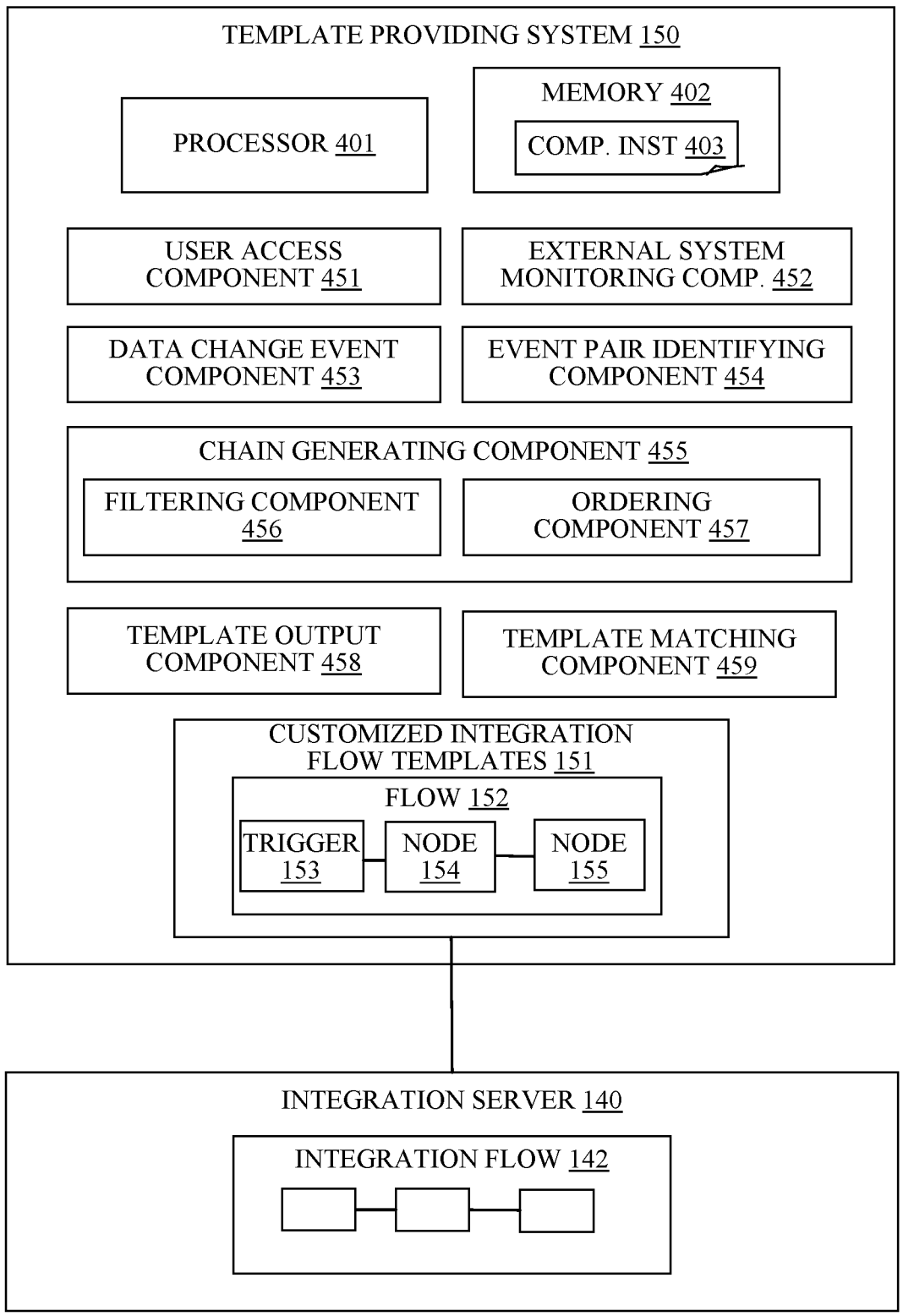
FIG. 4 is block diagram depicting a system, according to embodiments consistent with the figures.

Referring to FIG. 4, a block diagram depicts an example embodiment of a template providing system 150 provided at a computer system that includes at least one processor circuit 401, a hardware module, or a circuit for executing the functions of the described components which can be software units executing on the at least one processor circuit. Multiple processor circuits running parallel processing threads can be provided enabling parallel processing of some or all of the functions of the components. Memory 402 can be configured to provide computer instructions 403 to the at least one processor circuit 401 to carry out the functionality of the components.

The template providing system 150 may interface with an integration server 140 to provide integration flows 142 as described with reference to FIG. 1.

The template providing system 150 includes components providing the functionality of the described method. The template providing system 150 includes a user access component 451 for receiving user permission to gather data relating to data change events at external systems over a period of time, an external system monitoring component 452 for monitoring the external systems, and a data change event component 453 for gathering the data.

The template providing system 150 can include an event pair identifying component 454 for identifying pairs of external systems that have a same data value change in the data change events and a chain generating component 455 that can include a filtering component 456 to filter the event pairs based on defined criteria and an ordering component 457 for ordering systems in an event chain.

The template providing system 150 can include a template output component 458 for outputting a chain as a customized integration flow template 152. The template providing system 150 can also or alternatively include a template matching component 459 for using the generated event chain to match to an existing template integration flow.

Figure 5:
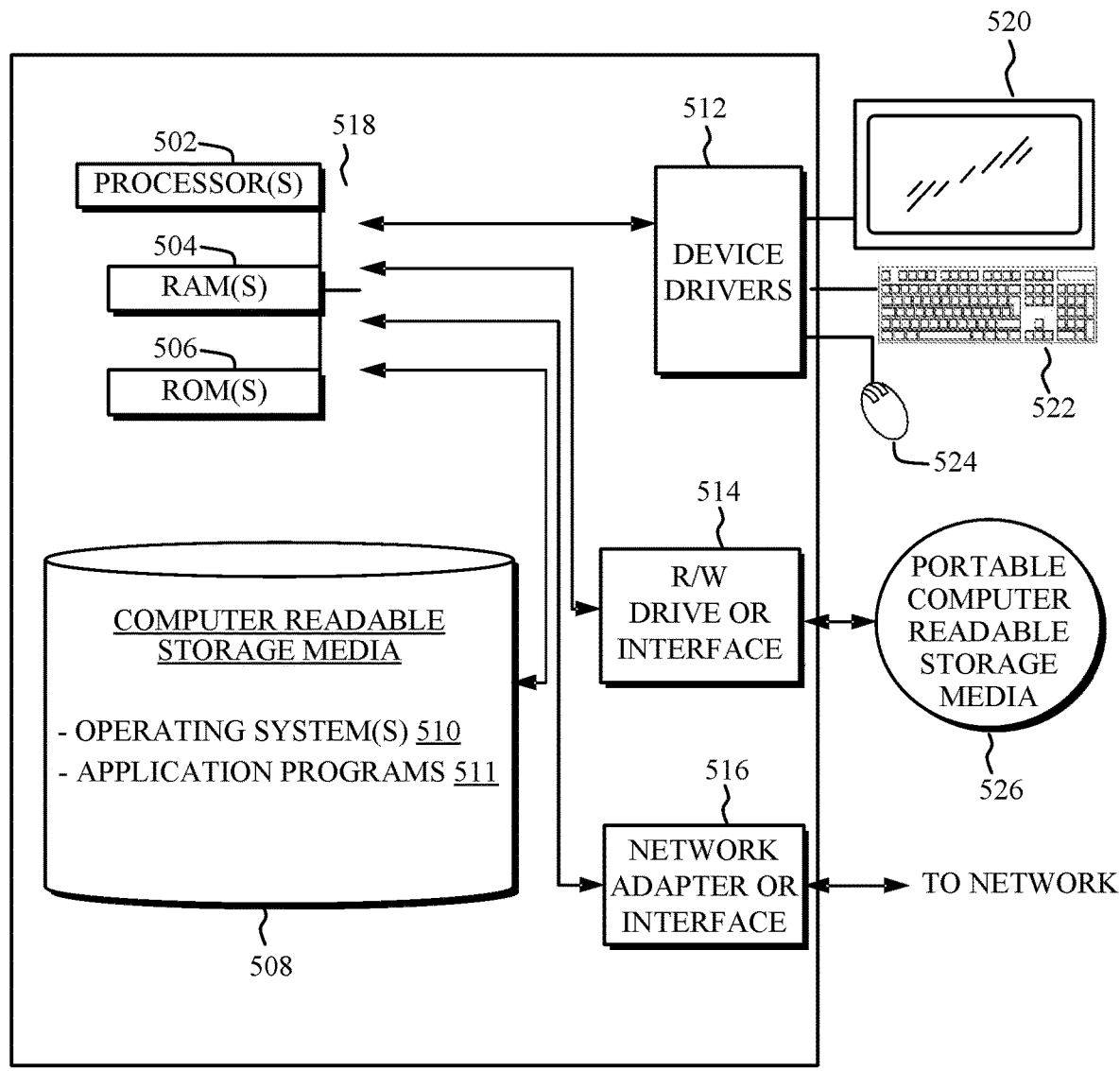
FIG. 5 is a block diagram of a computer system or cloud server in which the present invention can be implemented, according to embodiments consistent with the figures.

FIG. 5 depicts a block diagram of components of a computing system providing the integration server 140 and template providing system 150 of FIGS. 1 and 4, in accordance with an embodiment of the present invention. It should be appreciated that FIG. 5 provides only an illustration of one implementation and does not imply any limitations with regard to the environments in which different embodiments can be implemented. Many modifications to the depicted environment may be made.

The computing system can include at least one processor circuit 502, at least one computer-readable RAMs 504, at least one computer-readable ROM 506, at least one computer-readable storage medium 508, device drivers 512, read/write drive or interface 514, and network adapter or interface 516, all interconnected over a communications fabric 518. Communications fabric 518 can be implemented with any architecture designed for passing data and/or control information between processor circuits (such as microprocessors, communications and network processors, etc.), system memory, peripheral devices, and any other hardware components within the system.

At least one operating system 510, and application programs 511, such as the template providing system 150 are stored on at least one of the computer-readable storage media 508 for execution by at least one of the processor circuits 502 via at least one of the respective RAMs 504 (which typically include cache memory). In the illustrated embodiment, each of the computer-readable storage media 508 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer-readable storage media that can store a computer program and digital information, in accordance with embodiments of the invention.

Computing system can also include a R/W drive or interface 514 to read from and write to at least one portable computer-readable storage medium 526. Application programs 511 on computing system can be stored on at least one of the portable computer-readable storage media 526, read via the respective R/W drive or interface 514 and loaded into the respective computer-readable storage media 508.

Computing system can also include a network adapter or interface 516, such as a TCP/IP adapter card or wireless communication adapter. Application programs 511 on computing system can be downloaded to the computing device from an external computer or external storage device via a network (for example, the Internet, a local area network or other wide area networks or wireless networks) and network adapter or interface 516. From the network adapter or interface 516, the programs can be loaded into the computer-readable storage media 508. The network can comprise copper wires, optical fibers, wireless transmission, routers, firewalls, switches, gateway computers and edge servers.

Computing system can also include a display screen 520, a keyboard or keypad 522, and a computer mouse or touchpad 524. Device drivers 512 interface to display screen 520 for imaging, to keyboard or keypad 522, to computer mouse or touchpad 524, and/or to display screen 520 for pressure sensing of alphanumeric character entry and user selections. The device drivers 512, R/W drive or interface 514, and network adapter or interface 516 can comprise hardware and software stored in computer-readable storage media 508 and/or ROM 506.

The present invention can be a system, a method, and/or a computer program product at any possible technical detail level of integration. The computer program product can include a computer-readable storage medium (or media) having computer-readable program instructions thereon for causing a processor circuit to carry out aspects of the present invention.

The computer-readable storage medium can be a tangible device that can retain and store instructions for use by an instruction execution device. The computer-readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions can be provided to a processor circuit of a computer, or other programmable data processing apparatus to produce a machine, such that the instructions, which execute via the processor circuit of the computer or other programmable data processing apparatus, create means for implementing the functions/acts specified in the flowchart and/or block diagram block or blocks. These computer-readable program instructions can also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions can also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be accomplished as one step, executed concurrently, substantially concurrently, in a partially or wholly temporally overlapping manner, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
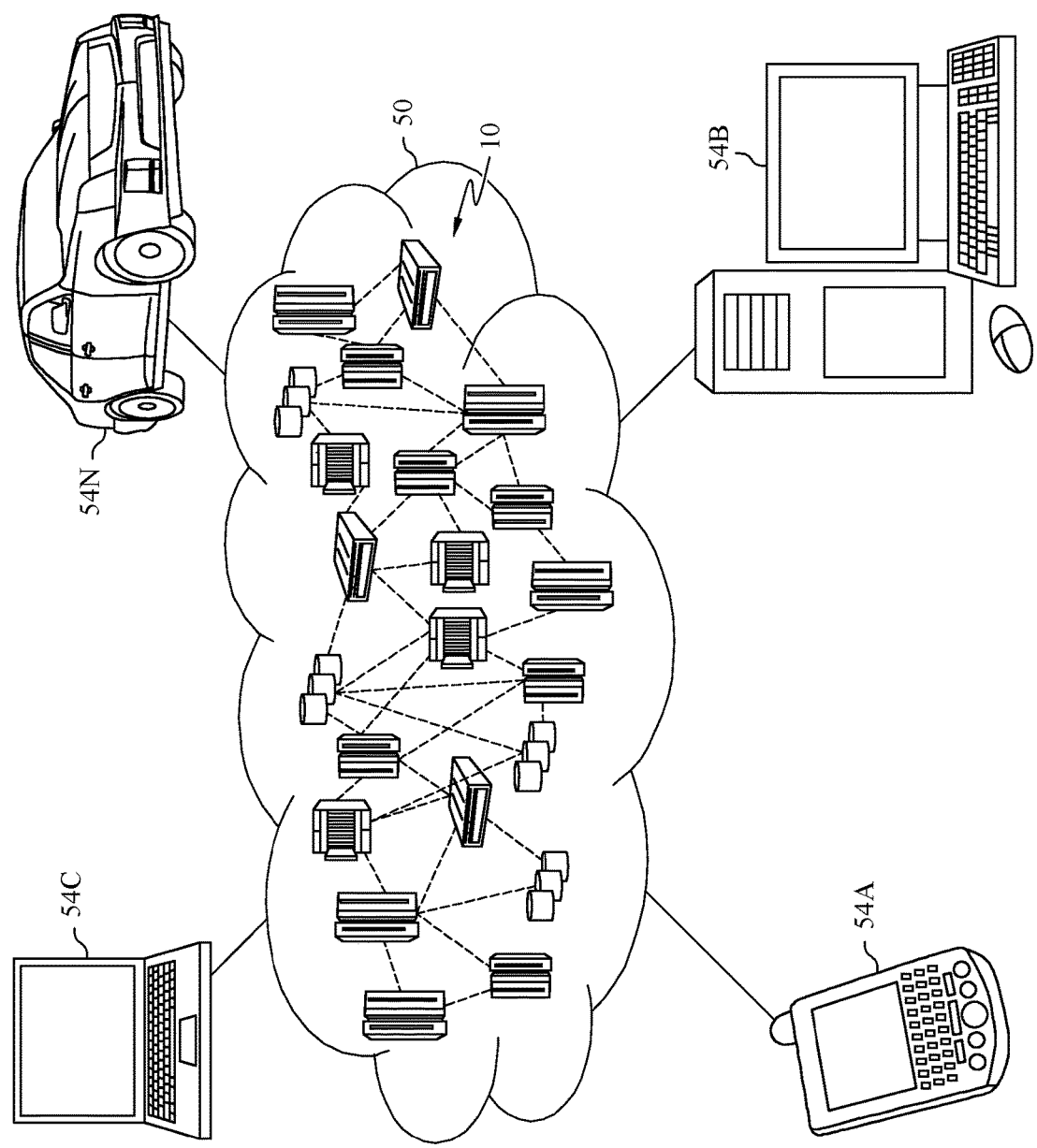
FIG. 6 is a schematic diagram of a cloud computing environment in which the present invention can be implemented, according to embodiments consistent with the figures.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
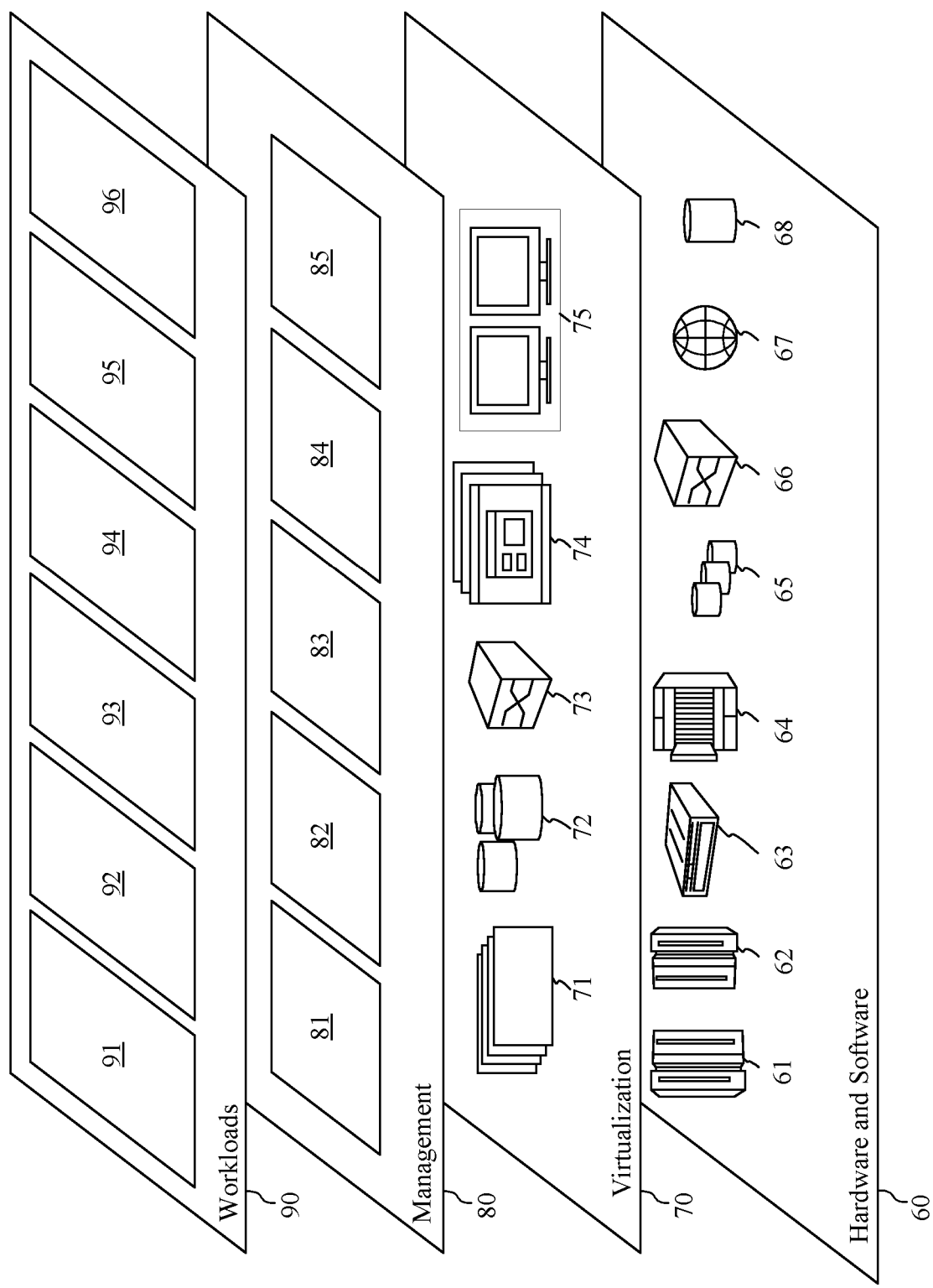
FIG. 7 is a diagram of abstraction model layers of a cloud computing environment in which the present invention can be implemented, according to embodiments consistent with the figures.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75.

In one example, management layer 80 can provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment can be utilized. Examples of workloads and functions which can be provided from this layer include: mapping and navigation 91; software development and lifecycle management 92; virtual classroom education delivery 93; data analytics processing 94; transaction processing 95; and integration flow template processing 96.

A computer program product of the present invention comprises one or more computer-readable hardware storage devices having computer-readable program code stored therein, said program code executable by one or more processor circuits to implement the methods of the present invention.

A computer system of the present invention comprises one or more processor circuits, one or more memories, and one or more computer-readable hardware storage devices, said one or more hardware storage device containing program code executable by the one or more processor circuits via the one or more memories to implement the methods of the present invention.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method for providing customized integration flow templates to external systems, the method comprising:
   monitoring user interaction with a plurality of systems external to an integration system to read data changes at the external systems;
   identifying at least one event pair, wherein each at least one event pair is between two external systems having a same data change event in the two external systems, and the two external systems are marked as an event pair when the two external systems include common fields containing the same data change event;
   filtering each at least one event pair for inclusion in an events chain;
   ordering, based on a timestamp of the same data change event in each of the two external systems, the external systems of the at least one filtered event pair included in the events chain; and
   outputting a customized integration flow template, based on the ordered external systems of each of the at least one event pair.

2. The method of claim 1, wherein the same data change event occurs in response to multiple instances being identified of a same data value entered in fields that are common with the two external systems with a one-to-one mapping relationship of a majority of the multiple instances of the same data value.

3. The method of claim 1, wherein the identifying at least one event pair includes identifying data change events of each external system and comparing the data change events with the data change events of other external systems, and wherein each event pair includes fields that are common with another identified event pair.

4. The method of claim 1, further comprising receiving user access to user interactions for an account of an integration system, the integration system providing access to the plurality of external systems to read data changes for a defined time period and to capture user routines on which to base the customized integration flow template.

5. The method of claim 1, wherein the filtering at least one event pair includes limiting the identified event pairs to a group of event pairs that all include a common external system.

6. The method of claim 1, wherein the filtering at least one event pair includes filtering the at least one event pair by a predefined threshold of same data change values of the same data change event of a reference event pair and referencing the same data change values of the same data change event as endpoints of the events chain.

7. The method of claim 6, further comprising selecting, as the reference event pair, the at least one event pair with a highest number of the same data change values in the same data change event.

8. The method of claim 1, wherein the filtering at least one event pair includes processing to discard event pairs to find a single data flow as a basis of the customized integration flow template and to remove any loops.

9. The method of claim 6, wherein the ordering the external systems includes:
   iterating, for each of the endpoints of the events chain, through data changes in the events chain; and
   ordering, by comparing the timestamps of a majority of the same data change event in the two external systems, the position of the at least one filtered event pair in the events chain to generate the customized integration flow template.

10. The method of claim 8, further comprising processing any discarded event pairs to find another data flow as a basis for another customized integration flow template.

11. The method of claim 1, wherein the outputting a customized integration flow template includes matching the ordered external systems to an existing template to select a template for use.

12. The method of claim 1, wherein the outputting a customized integration flow template includes publishing the customized integration flow template for use by other integration system users.

13. A system for providing customized integration flow templates to external systems, the system comprising:
 a memory; and
 a processor communicatively coupled to the memory, wherein the processor is configured to perform a method comprising:
 monitoring user interaction with a plurality of systems external to an integration system to read data changes at the external systems;
 identifying at least one event pair, wherein each event pair is between two external systems having a same data change event in the two external systems, and the two external systems are marked as an event pair when the two external systems include common fields containing the same data change event;
 filtering at least one event pair for inclusion in an events chain;
 ordering, based on timestamps of the data change events, the external systems of the at least one filtered event pair in the events chain; and
 outputting a customized integration template, based on the ordered external systems of each of the at least one event pair.

14. The system of claim 13, wherein the identifying step includes:
 identifying data change events of each external system; and comparing the events with the data change events of the other external systems, wherein each event pair includes common fields with another identified event pair.

15. The system of claim 13, wherein the processor is further configured to perform the method further comprising:
 receiving user access to user interactions for an account of an integration system, the integration system providing access to a plurality of external systems to read data changes for a defined time period and to capture user routines on which to base the customized integration flow template.

16. The system of claim 13, wherein the filtering step includes:
 limiting the identified event pairs to a group of event pairs that all include a common external system; and
 filtering the event pairs by a predefined threshold of same data change values of a same data change event of a reference event pair and referencing the same data change values of the same data change event as endpoints of the events chain.

17. The system of claim 13, wherein the filtering step includes:
 processing to discard event pairs to find a single data flow as the basis of the customized integration flow template and to remove any loops; and
 processing any discarded event pairs to find another data flow as a basis for another customized integration flow template.

18. The system of claim 16, wherein the ordering step includes:
 iterating, for each endpoint of the events chain, through the data changes in the events chain; and
 ordering, by comparing the timestamps of the majority of same data change events, the position of the event pairs in the events chain to generate the customized integration flow template.

19. The system of claim 13, wherein the outputting step includes:
 matching the ordered external systems to an existing template to select a template for use; and
 publishing the template for use by other integration system users.

20. A computer program product for providing customized integration flow templates to external systems, the computer program product comprising at least one non-transitory computer-readable storage medium having program instructions embodied therewith, the program instructions executable by at least one computer processor circuit to cause the processor circuit to:
 monitor user interaction with a plurality of systems external to an integration system to read data changes at the external systems;
 identify at least one event pair, wherein each event pair is between two external systems having a same data change event in the two external systems, and the two external systems are marked as an event pair when the two external systems include common fields containing the same data change event;
 filter at least one event pair for inclusion in an events chain;
 order, based on timestamps of the data change events, the external systems of the at least one filtered event pairs in the events chain; and
 output a customized integration template, based on the ordered external systems of the at least one event pair.

* * * * *